United States Patent [19]

Eaton et al.

[11] Patent Number: 5,574,079
[45] Date of Patent: Nov. 12, 1996

[54] METHOD FOR THE PREPARATION OF WATER-BORNE COATING COMPOSITIONS USING THERMOPLASTIC POLYHYDROXYETHER RESINS HAVING NARROW POLYDISPERSITY

[75] Inventors: Robert F. Eaton, Belle Mead, N.J.; Robert N. Johnson, Phoenixville, Pa.

[73] Assignee: Union Carbide Chemicals & Plastics Technology Corporation, Danbury, Conn.

[21] Appl. No.: 363,632

[22] Filed: Dec. 21, 1994

[51] Int. Cl.$^6$ ........................................... C08F 283/06
[52] U.S. Cl. .......................... 523/423; 525/529; 525/530; 525/531; 525/930
[58] Field of Search ...................... 523/423; 525/391, 525/529, 531, 930

[56] References Cited

U.S. PATENT DOCUMENTS

| | | | |
|---|---|---|---|
| 4,212,781 | 7/1980 | Evalis et al. | 260/29.4 |
| 4,355,122 | 10/1982 | Fan | 523/423 |
| 4,374,875 | 2/1983 | Fan | 427/386 |

*Primary Examiner*—Tae Yoon
*Attorney, Agent, or Firm*—W. K. Volles

[57] ABSTRACT

The present invention relates to water-borne thermoplastic polyhydroxyether resins having narrow polydispersity ($M_w/M_n < 4.0$ and $M_n > 7,000 < 12,000$), and the use of such resins in water-borne coating compositions.

9 Claims, No Drawings

METHOD FOR THE PREPARATION OF WATER-BORNE COATING COMPOSITIONS USING THERMOPLASTIC POLYHYDROXYETHER RESINS HAVING NARROW POLYDISPERSITY

BACKGROUND OF THE INVENTION

This invention relates to a method for the preparation of water-borne thermoplastic polyhydroxyethers having narrow polydispersity, coating compositions containing the same, and the use of such compositions for providing flexible coatings.

Coatings that contain no solvents have been prepared from very low molecular weight epoxy resins. The resin in the coating serves as the wetting agent and as the vehicle for any pigments or fillers desired. Because there is no solvent, coatings of this type tend to be free from pinholes, but have disadvantages such as brittleness, poor thermal stability and relatively high costs.

Coating compositions based on higher molecular weight epoxy resins have been prepared as solutions, formulated with solvent, curing agents, modifiers and pigments. These higher molecular weight epoxy resins are often in the form of an ester, obtained by reacting the epoxy resin with a fatty acid. While suitable for many purposes, epoxy ester-based coatings also have disadvantages such as being vulnerable to caustic attack.

In more recent years, there has been a trend toward water-based coating compositions containing epoxy resins, because of ease of handling and cleanup. One such resin is a modified epoxy resin made by grafting an addition monomer component onto the aliphatic backbone of the epoxy resin. For water-dispersible coatings, the addition polymerizable monomer is usually acrylic acid. Such water-dispersed epoxy coatings are particularly useful for the formulation of can coatings. These resins perform well when sprayed onto the surface of an already formed can body but have not found success for use in coating surfaces that are later formed into various shapes, including can ends. This is due to the inflexibility of the resins and their relatively low molecular weight. Increasing the molecular weight of the epoxy resin in order to achieve the desired properties results in the use of strong organic solvents, in order to dissolve the higher molecular weight resin, which must later be removed.

Another form of water-borne resins is based on thermoplastic polyhydroxyether resins, a family of amorphous, high molecular weight phenoxy resins derived from diphenols and epichlorohydrin. These "phenoxy" resins are known for their excellent flexibility, impact and abrasion resistance and adhesive strength. Because of these properties, they are used commercially for a variety of water-borne coatings. However, because of their high molecular weight and chain rigidity, again, a large amount of strong organic solvent must be employed to achieve a satisfactory applicable production process. To prevent pollution of the atmosphere, environmental standards require that such strong organic solvents be either recovered or burned at considerable costs.

The need exists for water-borne thermoplastic polyhydroxyether resin coating compositions that provide coatings having the desired toughness and flexibility for use on flexible substrates, while having low viscosities which do not require additional steps of solvent reclamation.

SUMMARY OF THE INVENTION

It has been found that by preparing water-borne coating compositions from thermoplastic polyhydroxyether resins having a narrow polydispersity, the step of removing organic solvents from such compositions can be eliminated. Polydispersity, as used herein is defined as the ratio of weight average molecular weight ($M_w$) to number average molecular weight ($M_n$) for a particular thermoplastic polyhydroxyether resin. Narrow polydispersity, as used herein, is defined as a ratio of weight average molecular weight to number average molecular weight of less than 4, with a number average molecular weight greater than 7,000 and less than 12,000 ($M_w/M_n<4$; $7000<M_n<12,000$). These thermoplastic polyhydroxyether resins, having narrow polydispersity, provide coatings that exhibit improved performance properties when compared to epoxy resins and performance properties equal to those of known, conventional phenoxy resins.

DETAILS OF THE INVENTION

The method of the present invention involves preparing a water-borne thermoplastic polyhydroxyether (phenoxy) resin dispersion by grafting one or more ethylenically unsaturated monomers, preferably having 3 to about 8 carbons, onto a thermoplastic polyhydroxyether having a narrow polydispersity. ($M_w/M_n<4$; $7000<M_n<12,000$). It is desirable that at least one of the monomers contain sufficient carboxyl groups to provide from about 1 to 100 carboxyl groups per 10 monomeric units of thermoplastic polyhydroxyether. The resulting grafted thermoplastic polyhydroxyether is then blended with water and a water-miscible base resulting in a usable coating composition.

The grafting operation can be carried out by conventional techniques, such as, suspension polymerization wherein powdered thermoplastic polyhydroxyether, carboxyl containing monomer and free radical initiator are suspended in a liquid medium and polymerized; polymerization of the above ingredients in a melt extruder; and solution polymerization of the above ingredients as a varnish in an organic solvent. Solution polymerization is the preferred method of preparing the grafted thermoplastic polyhydroxyethers of the present invention, and is preferably carried out in a high turbulence field.

The term "thermoplastic polyhydroxyether" herein refers to substantially linear polymers having the general formula:

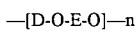

—[D-O-E-O]—n wherein D is the radical residuum of a dihydric phenol, E is a hydroxyl containing radical residuum of an epoxide and n represents the degree of polymerization and is at least 30. The term "thermoplastic polyhydroxyether" is intended to include mixtures of at least two thermoplastic polyhydroxyethers.

Thermoplastic polyhydroxyethers can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide, generally in an aqueous medium at a temperature of about 10° C. to about 50° C., until at least about 60 mole percent of the epihalohydrin has been consumed. The thermoplastic polyhydroxyethers thus produced, which are useful in the present invention, have a weight average molecular weight ($M_w$) greater than about 20,000 and less than about 40,000, and a number average molecular weight ($M_n$) of at least 7,000 and less than about 12,000, as determined by gel permeation chromatography. This combination of relatively low $M_w$ (20,000 to about 40,000) and high $M_n$ (7,000 to about 12,000), results in thermoplastic polyhydroxyethers having the desired narrow polydispersity ($M_w/M_n<4$; $7000<M_n<12,000$).

The dihydric phenol contributing the phenol radical residuum, D, can be a dihydric mononuclear phenol, a dihydric polynuclear phenol, or mixtures thereof. Suitable dihydric mononuclear phenols and dihydric polynuclear phenols are disclosed in U.S. Pat. No. 4,355,122. Preferred dihydric polynuclear phenols include bis(hydroxyphenyl) alkanes, di(hydroxyphenyl) sulfones, di(hydroxyphenyl) ethers, and the like.

The epoxide contributing the hydroxyl containing radical residuum, E, can be monoepoxide or diepoxide. By "epoxide" is meant a compound containing an oxirane group, i.e., oxygen bonded to two vicinal aliphatic carbon atoms. Suitable epoxides are disclosed in U.S. Pat. No. 4,355,122; and include monoepoxides, diepoxides, saturated epoxides and the like.

In the method of the present invention, the thermoplastic polyhydroxyether resins are first dissolved in an appropriate water-miscible solvent. Preferred water-miscible solvents useful in the present invention include solvents that are relatively non-volatile, and have an affinity for the thermoplastic polyhydroxyether resins. Preferred water-miscible solvents include ethylene and propylene glycol ethers, such as butyl glycol ether (butyl Cellosolve), and ethyl glycol ether (ethyl Cellosolve); and lower molecular weight alcohols, such as butanol. After dissolving the thermoplastic polyhydroxyether resin, the desired ethylenically unsaturated monomer or monomers to be grafted are then introduced into the mixture.

Preferred ethylenically unsaturated monomers include one or more ethylenically unsaturated hydrocarbon monomers having from about 3 to 8 carbons. It is desirable that at least one of the monomers contain sufficient carboxyl groups to provide from about 1 to 100 carboxyl group per 10 monomeric units of thermoplastic polyhydroxyether. Such monomers include acrylic acid, methacrylic acid, itaconic acid, maleic acid, fumaric acid and the like. Exemplary ethylenically unsaturated monomers that do not contain carboxyl groups include acrylic or methacrylic alkyl esters, such as methyl methacrylate, ethyl acrylate, n-propyl methacrylate, butyl acrylate, and the like; cyano-containing monomers, such as, acrylonitrile, methacrylonitrile, and the like; aromatic vinyl monomers, such as, styrene, α-methyl styrene, p-vinyl toluene and the like.

The grafting of the ethylenically unsaturated monomers can be accomplished by standard polymerization techniques known in the art. Solution polymerization using a free radical initiator, such as benzoyl peroxide, azobisisobutyronitrile and the like is preferred.

The grafted thermoplastic polyhydroxyether resin is then blended, preferably in a high turbulence field, with water and a water-miscible base. For purposes of this invention, the term "water-miscible base" is used in the broad sense to include any proton acceptor that will neutralize the acid functionalities of the grafted thermoplastic polyhydroxyether. Exemplary bases may be both organic and inorganic, and include alkali metal or alkaline earth hydroxides, such as, sodium hydroxide, potassium hydroxide, and the like; ammonium hydroxide; organic amines including monoalkylamines, alkanolamines, aromatic amines, cyclic amines, alkylaryl amines, and the like. Preferred amines include ammonia, triethylamine and dimethylethanolamine.

The resulting water-borne dispersion of thermoplastic polyhydroxyethers has a resin solids content of from about 20% to about 30%, and do not require a step of volatilization of strong organic solvents, as is standard practice with known water-borne phenoxy resin dispersions. The water-borne thermoplastic polyhydroxyether resins having narrow polydispersity may be used in coating compositions without separate steps of concentration to increase solids content and remove volatile strong organic solvents.

An aminoplast resin may be added to the water-borne thermoplastic polyhydroxyether resin dispersion to facilitate crosslinking, or the dispersions may be crosslinked by heating, as is known in the art. Suitable crosslinking agents include water soluble or water dispersible melamine, benzoquanamine, acetoquanamine, and urea resins such as ureaformaldehyde.

The coating compositions of the present invention may be applied to substrates by any convention method, such as spraying, rolling, dipping, and the like.

The invention is further described in the Examples that follow. All parts and percentages are by weight unless otherwise specified.

EXAMPLES

Example 1

Preparation of a Conventional Water-borne Thermoplastic Polyhydroxyether Resin

Into a 500 ml three-necked, round-bottom flask, equipped with a mechanical stirrer, a condenser, a thermometer, and a nitrogen inlet and outlet, there is charged 58.4 g of Bakelite Phenoxy Resin PKHH (a thermoplastic polyhydroxyether resin available from Phenoxy Associates, $M_w$=56,000, $M_n$=11,000 and $M_w/M_n$=5.1), 233.6 g of methyl ethyl ketone, 9.2 g of methyl methacrylate, 10.1 g of methacrylic acid, 0.92 g of ethyl acrylate, and 1.2 g of benzoyl peroxide dissolved in 20 ml of methyl ethyl ketone. The system is purged with nitrogen for 30 minutes. Thereafter, the slightly opaque reaction mixture is heated to 80° C. and refluxed for a period of two hours resulting in a colorless and translucent solution.

Example 2

Preparation of a Conventional Water-borne Thermoplastic Polyhydroxyether Resin Dispersion A mixture containing 250 g of the add-modified thermoplastic polyhydroxyether resin of Example 1 and 63.2 g of n-butanol are mixed in a Waring blender until the temperature reaches 40° C. Thereafter an aqueous solution composed of 10 g dimethylethanolamine and 250 g of water is added under vigorous mixing until the mixture's temperature reaches 50° C. A uniform, fine dispersion exhibiting a fairly strong Tyndall scattering effect is obtained. The dispersion exhibits a Brookfield viscosity of 28 cps and a pH of 8.9 at 26.2° C. Total solids of the water-borne phenoxy resin dispersion is 12.5%.

Example 3

Preparation of Conventional Water-borne Thermoplastic Polyhydroxyether Resin Coating Composition Four hundred grams of the water-borne thermoplastic polyhydroxyether resin dispersion prepared in Example 2 is concentrated under vacuum for ten (10) hours. The concentrated product has a resin content of about 30 percent modified phenoxy resin solids.

The above-described methods illustrate that three separate steps are required to produce a conventional water-borne phenoxy resin coating composition. Prior to the present invention, it has been necessary to volatilize the thermoplastic polyhydroxyether resin dispersion in order to remove volatile strong organic solvents and to obtain the desired resin solids content for a suitable coating composition.

The following example illustrates the method of the present invention using thermoplastic polyhydroxyether resin starting materials having narrow polydispersity as described above.

Example 4

Method for Preparation of Water-borne Coating Compositions Using Thermoplastic Polyhydroxyether Resins Having Narrow Polydispersity Into a 1,00 ml three-necked, round-bottom flask, equipped with a mechanical stirrer, a condenser, a thermometer, and a nitrogen inlet and outlet, there is charged 260 g of a narrow polydispersity thermoplastic polyhydroxyether resin ($M_w=$ 27,000 –33,000, $M_n=$11,000 and $M_w/M_n=$2.6–3.3) and 60 g of butyl Cellosolve (a glycol ether solvent produced by Union Carbide Corporation), 48 g of methacrylic acid, 33 g of ethyl acrylate, 30 g of styrene, and 7.5 g of benzoyl peroxide dissolved in 85 g of butanol. The system is purged with nitrogen for 30 minutes. Thereafter, the reaction mixture is heated to 120° C. and refluxed for a period of two hours. After completion of the grafting reaction, 861 g of water and 42.8 g of dimethylethanolamine are added to the stirred mass at 75° C. The resulting fine particle dispersion has a Brookfield viscosity of 3500 cps and a phenoxy resin solids content of 21–24%. No volatilization of the resulting dispersion is required, and the dispersion may be used as a coating composition curable by heating or by the addition of a suitable crosslinking agent.

Example 5

Comparison of Coatings

A water dispersion of the preferred narrow polydispersity thermoplastic polyhydroxyether resin of Example 4 is mixed with two (2) parts per hundred of resin solids (PHR) of Cymel 370, a melamine crosslinking agent (available from Cytech Corp.), and coated onto an aluminum test panel using a conventional "drawdown" bar method, to give a dry film thickness of 0.25 mils after baking at 190° C. for 5 minutes.

For comparison, the conventional thermoplastic polyhydroxyether resin of Example 1 (prepared from PKHH, $M_w=$56,000, $M_n=$11,000 and $M_w/M_n=$5.1), is made into a water-borne resin dispersion using a method as described in Example 2. The water-borne resin dispersion is then concentrated as described in Example 3, to obtain a water-borne resin coating composition, which is subsequently mixed with a crosslinking agent, coated and baked as described above.

In addition, a conventional water-borne epoxy resin, EPON 1007, a diglycidyl ether of bisphenol A, available from Shell Oil Co., ($M_w<$20000, $M_n<$4000 and $M_w/M_n=$~5) is similarly mixed, coated and baked. The resulting panels prepared from all three coating compositions were evaluated by ASTM D-4145-"Zero T bend Test" and the following results were obtained:

| | Narrow Polydispersity Polyhydroxyether | Conventional Polyhydroxyether | Epoxy |
| --- | --- | --- | --- |
| Zero T-bend Test | pass | pass | fail |

The method of the present invention produces low weight average molecular weight thermoplastic polyhydroxyether resin coating compositions that have toughness equivalent to conventional high molecular weight thermoplastic polyhydroxyether resin coating compositions and improved toughness over relatively brittle water-borne epoxy resin coating compositions.

What is claimed is:

1. In a method of preparing water-borne thermoplastic polyhydroxyether dispersions, comprising:
   (a) dissolving a thermoplastic polyhydroxyether in a water-miscible solvent;
   (b) grafting one or more ethylenically unsaturated monomers onto said thermoplastic polyhydroxyether; and
   (c) blending said grafted thermoplastic polyhydroxyether with water and a water-miscible base to form a water-borne dispersion of said grafted thermoplastic polyhydroxyether:
   the improvement wherein;
      (i) the thermoplastic polyhydroxyether has a polydispersity of <4.0 and $M_n$ between 7,000 and 12,000, and
      (ii) an amount of water-miscible solvent is used in step (a) to provide the water-borne dispersion in step (c) with from about 20% to about 30% of said grafted thermoplastic polyhydroxyether without the removal of said solvent.

2. The method of claim 1 wherein said grafting is carried out in a water-miscible solvent having an affinity for said thermoplastic polyhydroxyether.

3. The method of claim 2 wherein said water-miscible solvent is selected from the group consisting of ethylene and propylene glycol ethers and butanol.

4. The method of claim 1 wherein said one or more ethylenically unsaturated monomers has from about 3 to 8 carbons.

5. The method of claim 4 wherein said one or more ethylenically unsaturated monomers is selected from the group consisting of methyl methacrylate, ethyl acrylate, n-propyl methacrylate, butyl acrylate, acrylonitrile, methacrylonitrile, styrene, α-methyl styrene and p-vinyl toluene.

6. The method of claim 4 wherein at least one of said monomers contains sufficient carboxyl groups to provide from about 1 to 100 carboxyl groups per 10 monomeric units of thermoplastic polyhydroxyether.

7. The method of claim 6 wherein said monomer is selected from the group consisting of acrylic acid, methacrylic acid, itaconic acid, maleic acid and fumaric acid.

8. The method of claim 1 wherein said blending is carried out in a high turbulence field.

9. The method of claim 1 wherein said water-miscible base is selected from the group consisting of sodium hydroxide, potassium hydroxide, ammonium hydroxide, ammonia, triethylamine and dimethylethanolamine.

* * * * *